US009183087B2

(12) United States Patent
DeCenzo

(10) Patent No.: US 9,183,087 B2
(45) Date of Patent: Nov. 10, 2015

(54) DATA STORAGE SUBGROUP WITH LOCAL AND SHARED RESOURCES

(75) Inventor: David Peter DeCenzo, Pueblo, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1412 days.

(21) Appl. No.: 11/147,137

(22) Filed: Jun. 7, 2005

(65) Prior Publication Data

US 2006/0277362 A1    Dec. 7, 2006

(51) Int. Cl.
| | |
|---|---|
| *G06F 12/00* | (2006.01) |
| *G06F 13/00* | (2006.01) |
| *G06F 13/28* | (2006.01) |
| *G06F 11/10* | (2006.01) |

(52) U.S. Cl.
CPC .... *G06F 11/1076* (2013.01); *G06F 2211/1059* (2013.01)

(58) Field of Classification Search
USPC .................................................. 711/112, 114
See application file for complete search history.

(56) References Cited

U.S. PATENT DOCUMENTS

| | | | |
|---|---|---|---|
| 4,608,631 A | 8/1986 | Stiffler et al. | |
| 5,032,975 A | 7/1991 | Yamamoto et al. | |
| 5,187,656 A | 2/1993 | Kurakake | |
| 5,809,279 A | 9/1998 | Oeda et al. | |
| 5,918,068 A * | 6/1999 | Shafe' .............................. | 710/11 |
| 6,009,275 A | 12/1999 | DeKoning et al. | |
| 6,018,430 A | 1/2000 | Ho et al. | |
| 6,490,121 B1 | 12/2002 | Pruett et al. | |
| 6,549,981 B2 | 4/2003 | McDonald et al. | |
| 6,608,571 B1 | 8/2003 | Delvaux | |
| 6,760,820 B2 | 7/2004 | Henson et al. | |
| 6,792,330 B1 | 9/2004 | Matsumoto et al. | |
| 2002/0056030 A1 * | 5/2002 | Kelly et al. .................... | 711/150 |
| 2003/0014207 A1 | 1/2003 | Arnaout et al. | |
| 2003/0107834 A1 | 6/2003 | Fish et al. | |
| 2003/0196023 A1 * | 10/2003 | Dickson ............................ | 711/1 |
| 2003/0236861 A1 | 12/2003 | Johnson et al. | |
| 2004/0139365 A1 | 7/2004 | Hosoya | |
| 2004/0153721 A1 * | 8/2004 | Fujimoto .......................... | 714/5 |

FOREIGN PATENT DOCUMENTS

| | | | |
|---|---|---|---|
| EP | 0 323 154 | * | 7/1989 |
| EP | 0422244 A1 | | 4/1991 |

(Continued)

*Primary Examiner* — Charles Rones
*Assistant Examiner* — Sidney Li
(74) *Attorney, Agent, or Firm* — Hall Estill Attorneys at Law

(57) ABSTRACT

Apparatus for storing and retrieving data such as in a computer network. A plurality of local data storage units each comprise a local control circuit and a housing which encloses a moveable data transducer adjacent a data storage medium. A shared resource module physically interconnects each of the local units, and includes shared circuitry that supplies a resource required by the local control circuits to transfer data to and from the data storage media. In some preferred embodiments, the resource comprises a programming instruction set that is utilized by a programmable processor in each of the local control circuits, such as servo code used to provide data transducer positional control. Alternatively, the resource comprises a shared buffer memory space utilized by read/write channels in each of the local control circuits. Preferably, data are stored across the data storage media using RAID techniques (redundant array of independent discs/devices).

17 Claims, 5 Drawing Sheets

(56) References Cited

FOREIGN PATENT DOCUMENTS

| | | | |
|---|---|---|---|
| EP | 0 446 733 | * | 9/1991 |
| EP | 0488771 B1 | | 6/1992 |
| JP | 54-139445 | | 4/1978 |
| JP | 2-278306 | | 11/1990 |
| JP | 3-235102 | | 10/1991 |
| JP | 04-057274 | | 2/1992 |
| JP | 06-259929 | | 9/1994 |
| JP | 08-022379 | | 1/1996 |
| JP | 08-221218 | | 8/1996 |
| JP | 08-328760 | | 12/1996 |
| JP | 2001-167040 | | 6/2001 |

* cited by examiner

DATA STORAGE SUBGROUP WITH LOCAL AND SHARED RESOURCES

FIELD OF THE INVENTION

The claimed invention relates generally to the field of data storage systems and more particularly, but not by way of limitation, to an apparatus comprising a plurality of local data storage units coupled to a shared resource module to form a data storage subgroup that utilizes local and shared resources to store and retrieve user data.

BACKGROUND

Computer-based systems enable a wide variety of data processing tasks to be accomplished in a fast and efficient manner. From hand-held consumer products to geographically distributed wide area networks with multi-device data storage arrays, such systems continue to increasingly pervade all areas of society and commerce.

Larger capacity data storage networks sometimes employ multiple numbers of individual data storage devices, such as hard disc drives, which are operationally arrayed together to form a large memory space. RAID techniques (redundant arrays of independent devices/discs) are also sometimes used to enhance the reliability with which data can be stored across such array.

While various approaches have been proposed in the art to enhance the construction and operation of such arrays, there remains a continual need for improvements in the art, and it is to these and other improvements that the claimed invention is generally directed.

SUMMARY OF THE INVENTION

Preferred embodiments of the present invention are generally directed to an apparatus for storing and retrieving data such as in a computer network.

In accordance with preferred embodiments, a plurality of local data storage units each comprise a local control circuit and a housing which encloses a moveable data transducer adjacent a data storage medium.

A shared resource module physically interconnects each of the local units, and includes shared circuitry that supplies a resource required by the local control circuits to transfer data to and from the data storage media.

In some preferred embodiments, the resource comprises a programming instruction set that is utilized by a programmable processor in each of the local control circuits, such as servo code used to provide data transducer positional control. Alternatively, the resource comprises a shared buffer memory space utilized by read/write channels in each of the local control circuits.

Preferably, data are stored across the data storage media using RAID techniques (redundant array of independent discs/devices).

These and various other features and advantages which characterize the claimed invention will become apparent upon reading the following detailed description and upon reviewing the associated drawings.

DETAILED DESCRIPTION

Figure 1:
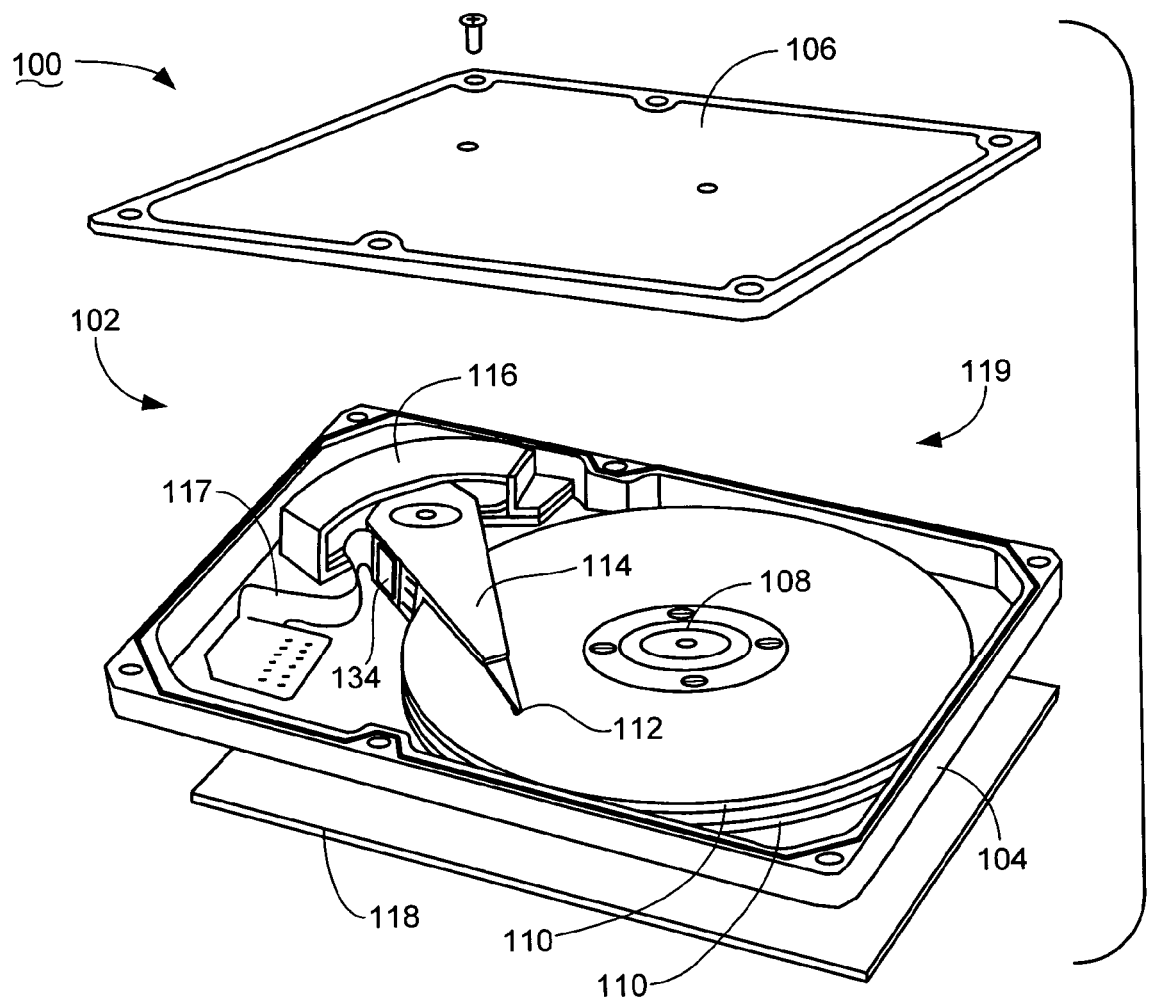
FIG. 1 is an exploded view of a particular construction for a local data storage unit in accordance with preferred embodiments of the present invention.

FIG. 1 provides an exploded view of a preferred construction for a local data storage unit 100 utilized in accordance with preferred embodiments of the present invention. The local unit 100 includes a rigid, environmentally controlled housing 102 formed from a base deck 104 and a top cover 106. A spindle motor 108 is mounted within the housing 102 to rotate a number of magnetic data storage media 110 (in this case, two) at a relatively high speed.

Data are stored on the media 110 in an array of concentric tracks (not shown), which are accessed by a corresponding array of data transducing heads 112 (transducers). The heads 112 are supported by an actuator 114 and moved across the media surfaces by application of current to a voice coil motor, VCM 116.

A flex circuit assembly 117 facilitates communication between the actuator 114 and local circuitry mounted on an externally mounted printed circuit board, PCB 118. In an alternative embodiment, the local circuitry is mounted elsewhere, such as within the interior of the housing 102, as desired.

For purposes herein, a head/disc assembly (HDA) 119 is defined as all of the various components of the local unit 100 apart from the local circuitry; that is, the HDA 119 comprises everything in FIG. 1 except the PCB 118. With regard to the operational capabilities of the local circuitry, it will be noted that the local unit 100 is not a stand-alone unit. That is, the local circuitry by itself is insufficient to enable the local unit 100 to provide data access operations with the media 108 without the use of separate resources not located within the confines of the local unit 100.

Figure 2:
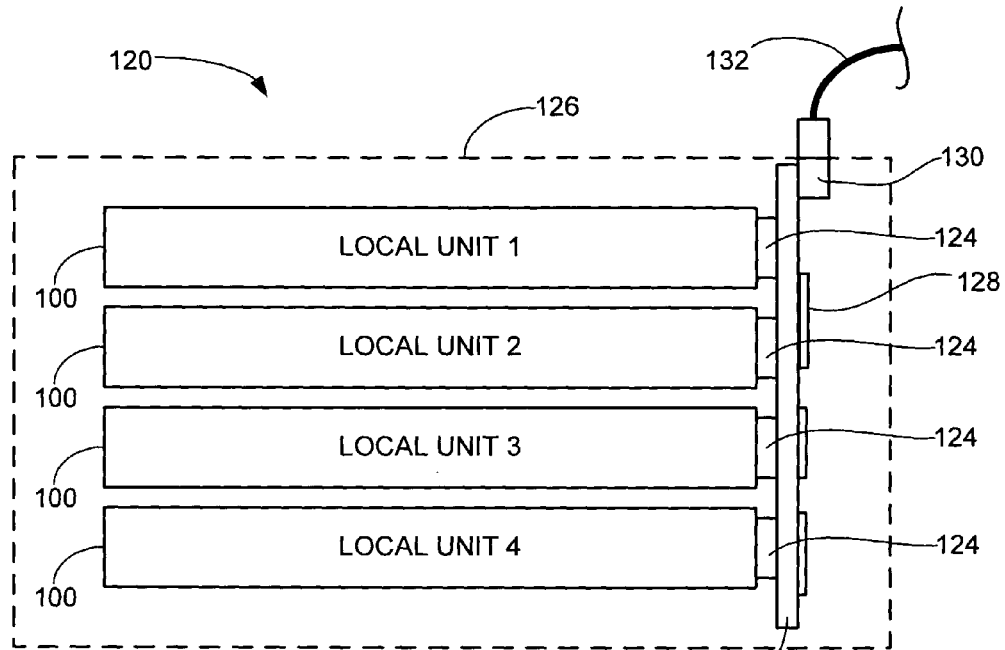
FIG. 2 is a generalized elevational view of a data storage subgroup formed from a number of the local units of FIG. 1.

Such resources are provided within the context of a data storage subgroup 120, as shown in FIG. 2. The subgroup 120 is formed from a number of local units (in this case, four) nominally identical to the local unit 100 of FIG. 1. The local units 100 are respectively coupled to a shared resource module 122.

The local units 100 are electrically interconnected with the module 122 via connector assemblies 124. Each such interconnection provides a plurality of individual paths for the transmission of data, clock signals, power, etc. The connector assemblies 124 can take any number of suitable forms such as, for example, external connectors affixed to the PCB 120 (FIG. 1), or through the use of bulkhead connectors that are integrated with the housing 102 of each local unit 100. Additional mechanical support of the local units 100 and the subgroup module 122 can be provided through the use of an enclosure (represented by broken line 126 in FIG. 2) that houses the local units 100 and the module 122.

The module 122 supports what is referred to herein as subgroup, or shared circuitry 128, described below. Connector 130 and ribbon cable assembly 132 interconnect the circuitry 128 to other components of a computer network.

Figure 3:
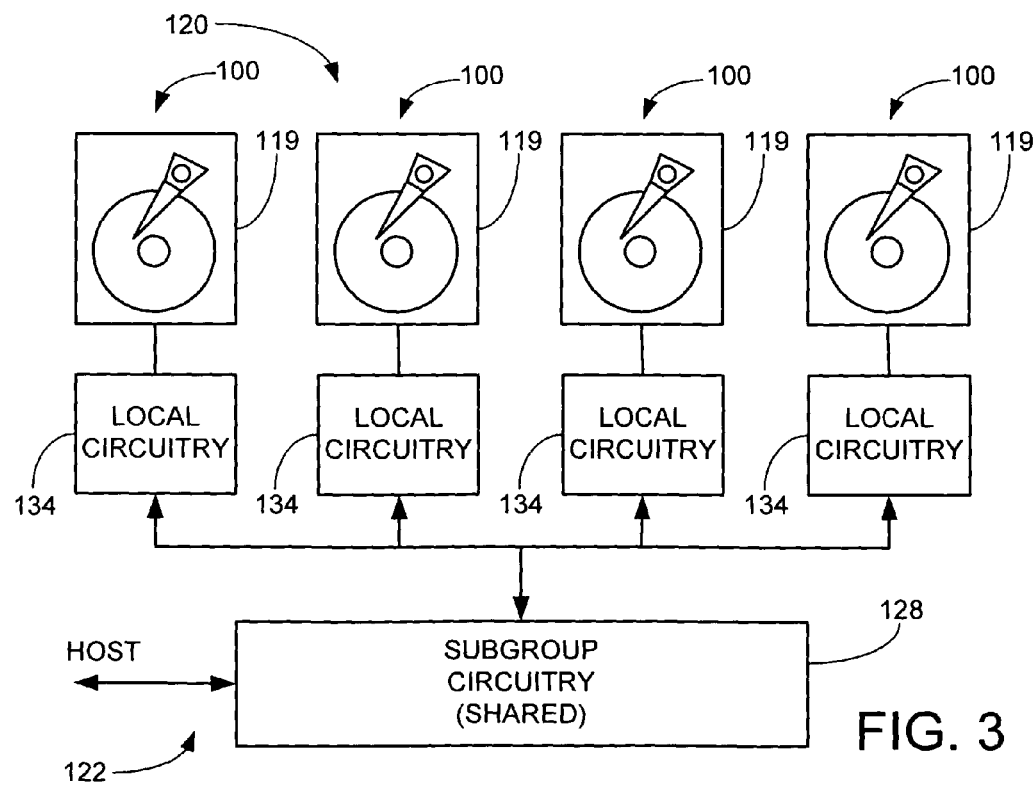
FIG. 3 provides a functional block diagram of the subgroup of FIG. 2.

FIG. 3 shows a functional representation of the subgroup 100 of FIG. 2. Blocks 134 denote the local circuitry of each of the local units 100. These local circuitry blocks 134 operationally interface with the subgroup circuitry 128 of the module 122.

Figure 4:
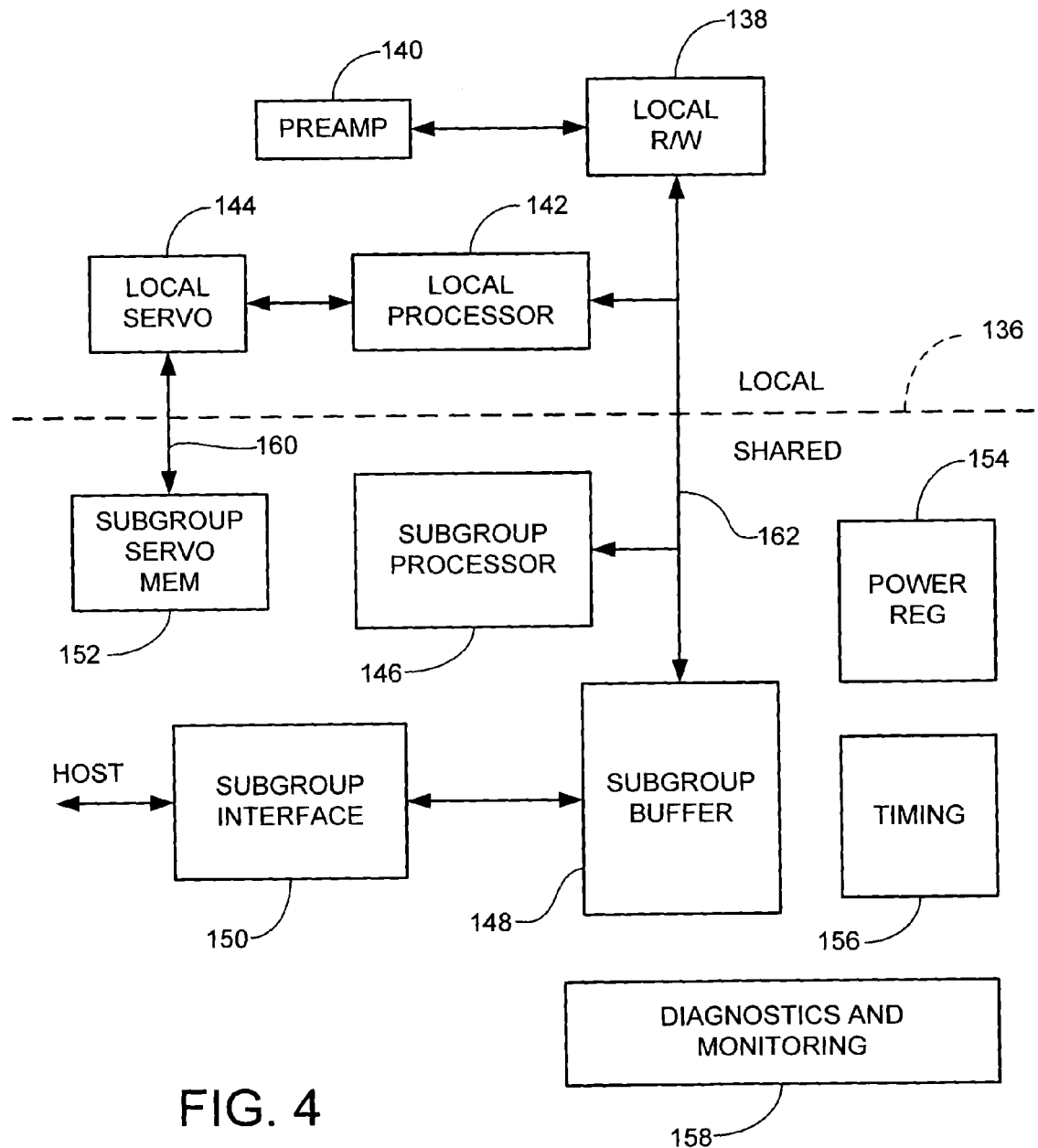
FIG. 4 provides a functional block diagram of relevant portions of the local circuitry and the subgroup (shared) circuitry of FIG. 3.

In FIG. 4, the circuitry above dividing line 136 represents a preferred arrangement of the local circuitry 134 of each unit 100, and the circuitry below line 136 represents a preferred arrangement of the shared circuitry 128 in the subgroup module 122. The local circuitry 134 includes a local read/write (R/W) channel 138, preamplifier/driver (preamp) circuit 140, local processor 142 and local servo circuit 144.

The R/W channel 138 operates during a write operation to encode and serialize data to be written to the media 108. Output signals from the R/W channel 138 are provided to the preamp 140, which in turn applies appropriate write currents to the associated head 112 to selectively magnetize the medium 108. During a subsequent read operation, the head 112 transduces a readback signal from the medium which is preamplified by the preamp 140, and decoded by the R/W channel 138 to output the originally stored data.

The local processor 142 preferably comprises a general purpose microprocessor or a digital signal processor (DSP). The local processor 142 interfaces with the local servo circuit 144 to carry out servo control operations for the heads 112, such as seeking to a destination track or track-following on a destination track. The local servo circuit 144 includes demodulation circuitry to demodulate servo data transduced from the media surfaces, as well as power amplifier circuitry to apply current to the VCM 116 (FIG. 1). As required, the local processor 142 further supplies appropriate tap weights or other parametric control values to the R/W channel 140 during the aforementioned read/write operations.

The shared circuitry 128 preferably includes a subgroup processor 146, a subgroup buffer 148, a subgroup interface (I/F) circuit 150, subgroup servo memory 152, and various miscellaneous blocks including power regulation circuitry 154, timing circuitry 156 and diagnostics and monitoring circuitry 158. Other groupings of circuitry can readily be utilized as desired, depending upon the requirements of a given application. The shared circuitry 128 is preferably incorporated into one or more specially configured ASICs.

The subgroup processor 146 preferably comprises a relatively powerful general purpose microprocessor which provides top level control for the subgroup 120. The subgroup buffer 148 is preferably characterized as an SRAM or similar volatile memory space configured to temporarily store data being transferred to or from the media 108 of the local units 100. The buffer 148 further preferably stores programming steps utilized by the subgroup processor 146, although this memory can be provided in another location. The subgroup I/F circuit 150 preferably comprises input/output controller hardware that enables the subgroup 120 to communicate with a host device preferably via a standard interface protocol (e.g., SAS, SCSI, fibre channel, etc.).

The subgroup servo memory 152 preferably comprises SRAM or flash memory to store servo code. The power regulation block 154 supplies power at appropriate voltage levels (+3.3V, ±5V, +12V, etc.) to the local units 100. The timing block 156 generates the appropriate clock and other timing signals to the local units 100, and the diagnostic and monitoring circuit 158 supplies appropriate error recovery and parametric monitoring and analysis capabilities for the units 100.

Figure 5:
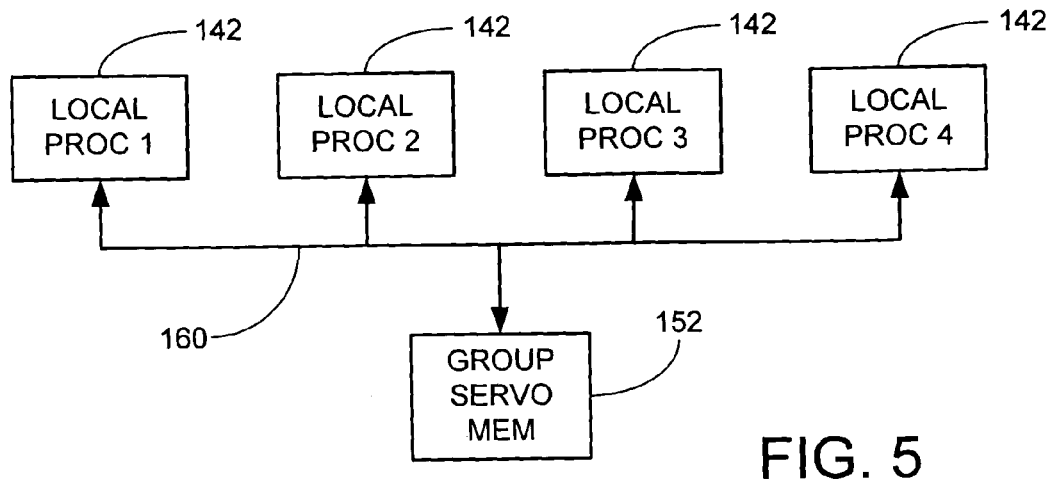
FIG. 5 generally illustrates a preferred manner in which servo control resources are divided between the local circuitry and the shared circuitry.

The generalized architecture of FIG. 4 allows common components to be incorporated onto the shared circuitry of the subgroup module 122, eliminating the need to incorporate duplicate sets of such components in each local unit 100. For example, as represented in FIG. 5, each local processor 142 utilizes a bus structure 160 to access a single, common instruction set of the servo code programming in the servo memory block 152.

Peer-to-peer bus arbitration techniques can be used to allow all of the processors 142 to jointly access the same instruction set without adversely affecting performance of any individual servo loop. It will be recognized that in a subgroup constituting n local units 100, a savings of n−1 instruction stores for the servo code is achieved by the architecture of FIGS. 4 and 5 over supplying each local unit with its own individual instruction store.

Figure 6:
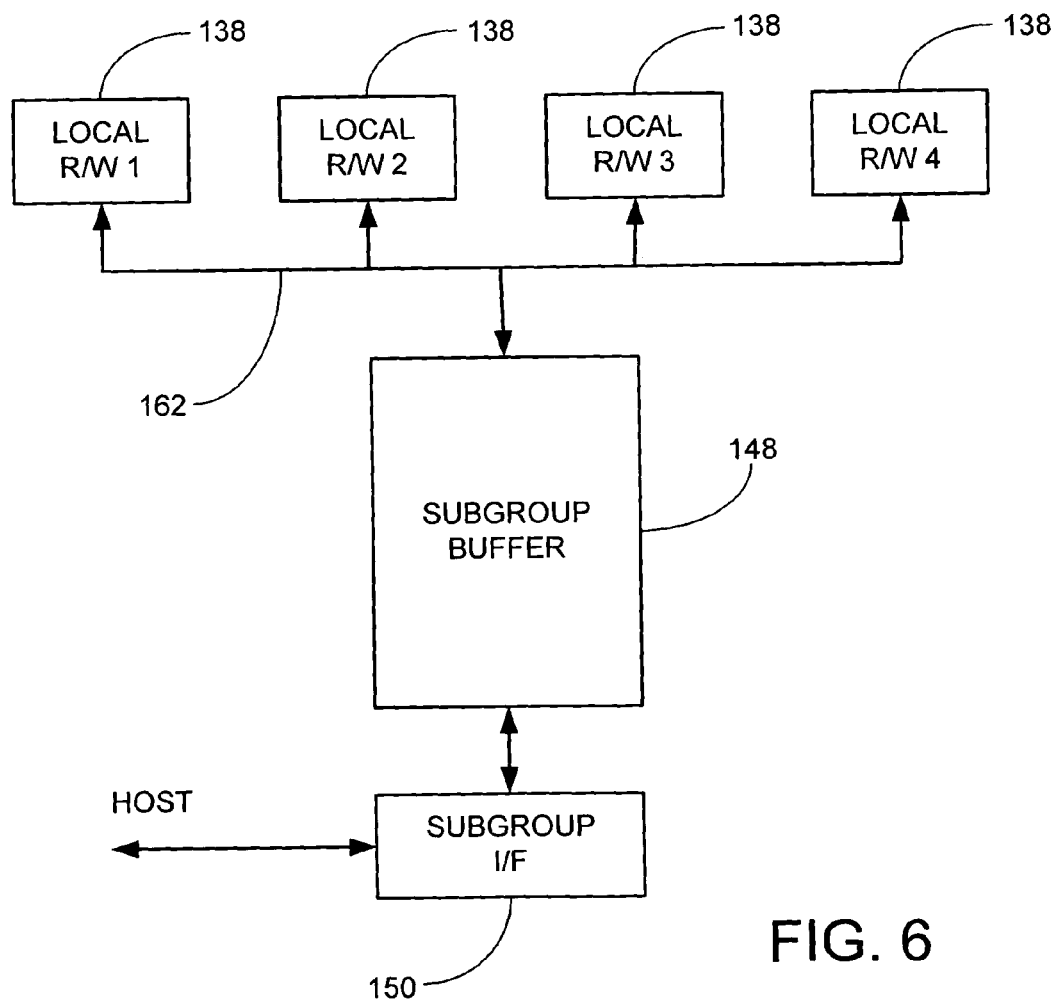
FIG. 6 generally illustrates a preferred manner in which data communication channel resources are divided between the local circuitry and the shared circuitry.

Similarly, as shown in FIG. 6, each local R/W channel 138 utilizes the subgroup buffer 148 to temporarily store readback data for subsequent transmission to the host, or to receive writeback data to be written to the media 108. As before, an arbitrated bus structure 162, preferably under control of the subgroup processor 146, is used to allow the transfer of data between the subgroup buffer 148 and the local R/W channels 138 without the need for an intermediate memory store therebetween (such as, e.g., a local buffer in each local unit 100).

The size of the subgroup buffer 148 is preferably at least n times the size requirements for each individual local unit 100. This advantageously allows the buffer memory to more closely follow the lowest cost per megabyte (MB) memory device trends, and eliminates the need to procure older technology, smaller components for each of the units 100. Also, more expensive memory types, such as ECC protected memory, can be utilized since the cost is spread out over the n local units 100.

Another advantage to the shared buffer architecture of FIG. 6 is that data transfers to the media in the local units 100 can be maintained in a common location under control of the subgroup processor 148. This would appear to improve efficiencies particularly when readback data are recovered and reassembled from multiple local units 100, as in a RAID environment. The programming utilized to control such transfers, including rotational optimization of command sequencing for each local unit 100, is also stored once (e.g., in the buffer 148) rather than n times.

From FIG. 6 it can be seen that further efficiencies are gained through the use of a single host interface (I/F block 150) instead of the use of n separate I/F blocks. The interface structures between the subgroup module 122 and the local units 100 can be a non-standard, simplified interface best suited to the particular application.

Figure 7:
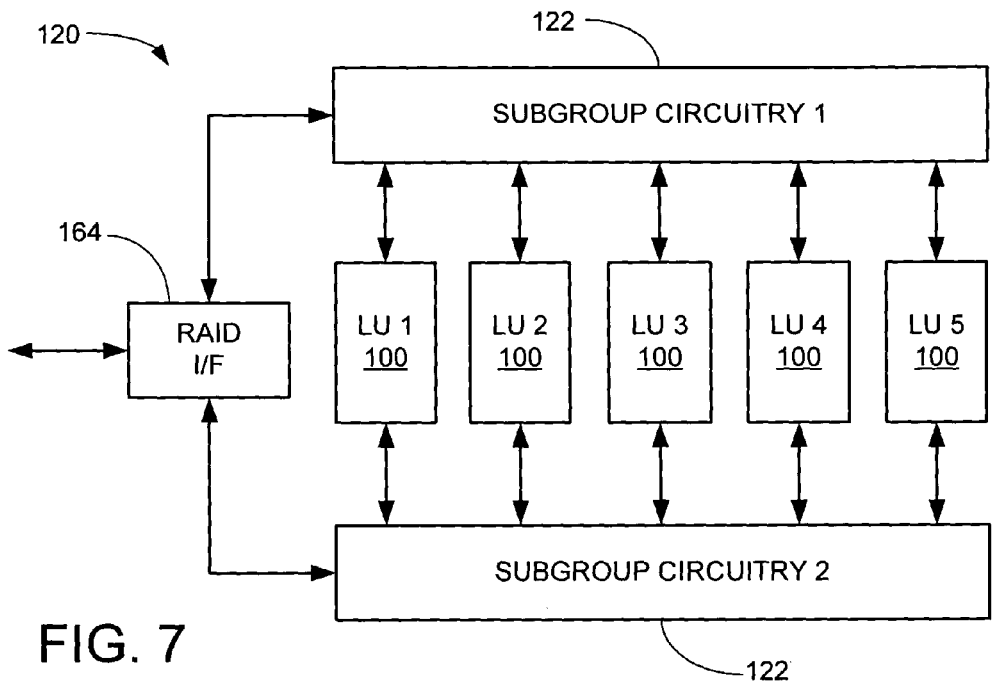
FIG. 7 is a block diagram representation of a particular subgroup configured with a RAID 5 architecture.

FIG. 7 provides an alternative construction for the subgroup 120. In this embodiment, five local units 100, numerically designated as LU 1 through LU 5, are arranged to store data in a RAID 5 arrangement (i.e., user data and parity data are striped across all of the units). Two separate subgroup modules 122 are coupled to the units 100 for redundancy. A RAID I/F block 172 provides a dual port R/W switch between the respective modules 122. Although not shown, a second, redundant set of five local units 100 could additionally be incorporated to provide mirroring (i.e., a RAID 5+1 configuration).

Figure 8:
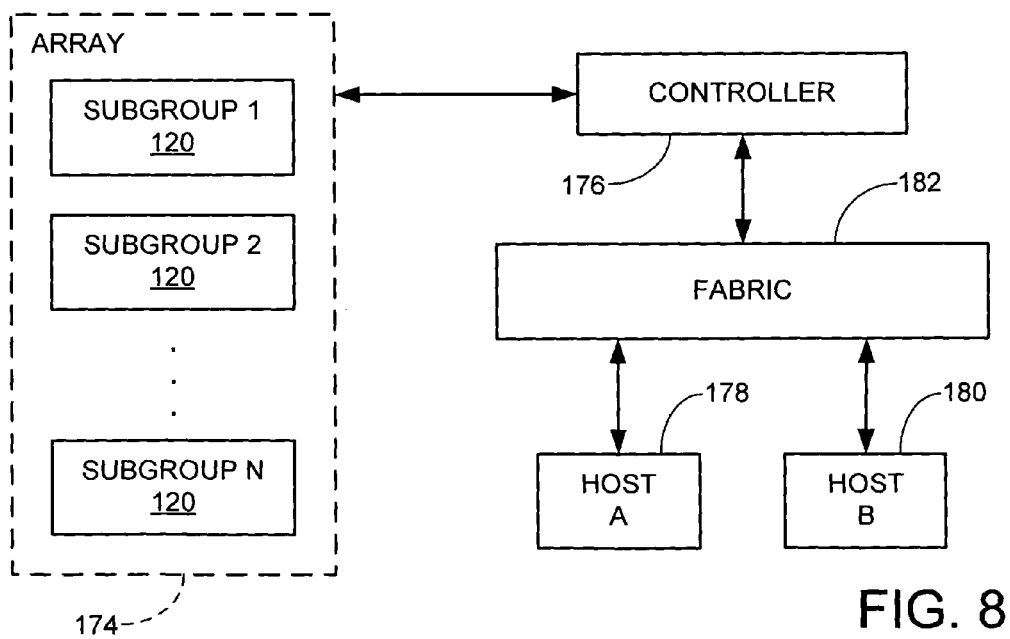
FIG. 8 is a block diagram representation of a network system that utilizes a number of the subgroups set forth in FIG. 7 to provide an array memory space.

FIG. 8 shows an array 174 formed from a number N of the subgroups 120 discussed above to provide an overall array memory space. This space is controlled by a top level controller 176. Although not shown, a second array and/or a second controller could also be utilized for redundancy. The controller 176 services access requests to the array from host computers A and B (denoted at 178, 180) through a network fabric 182. From a system standpoint, it is contemplated that the local units 100 would be observed to operate the same way as if the array 174 were formed from a plurality of stand-alone data storage devices (e.g., individual hard disc drives).

From the foregoing discussion it will be clear that the preferred embodiments of the present invention present several advantages over the prior art. Because the individual logical units 100 are not utilized in a stand-alone fashion, but rather are incorporated into a larger storage space, certain efficiencies are gained such as component count reductions and integrations.

Newer generation technologies, such as for the subgroup processor 146 and the SRAM used for the buffer 148, can be used to take advantage of higher levels of functionality at lower cost. RAID techniques can now be readily incorporated at the subgroup level, allowing individual subgroups to in turn be used as single devices for higher level RAID structures (e.g., a "RAID within a RAID").

It is also envisioned that maintenance updates are also significantly easier to enact; for example, only one new version of servo code or interface controller code be uploaded or otherwise installed, rather than accessing each individual local unit.

While the local unit 100 disclosed herein has utilized magnetic data storage, it will be appreciated that such is merely for purposes of illustration and is not limiting; rather, any number of other configurations, including optical and magneto-optical data storage, can be used as desired.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
    a plural number n local data storage units each comprising a local programmable processor and a housing which encloses a moveable data transducer adjacent a data storage medium; and
    a shared resource module which physically interconnects each of the n local data storage units, the module comprising a single shared memory device that stores a shared programming instruction set executed by each said local programmable processor, the shared programming instruction set comprising servo code used to control position of the transducer adjacent the data storage medium in each local unit, wherein only a single complete copy of the shared programming instruction set is stored within the single shared memory device and the local programmable processors use peer-to-peer bus arbitration to jointly access portions of the shared programming instruction set during said execution.

2. The apparatus of claim 1, in which the local programmable processors of at least two of the n local data storage units concurrently execute the servo code of the shared programming instruction to concurrently position the moveable data transducers of said at least two of the plurality of data storage units.

3. The apparatus of claim 2, wherein the shared resource module further comprises a peer-to-peer arbitrated bus between the memory space and each of the local programmable processors, and wherein said processors concurrently arbitrate access to the programming instruction set during operation of the apparatus.

4. The apparatus of claim 2, wherein each local control circuit further comprises a local read/write channel, and wherein the module further comprises a shared memory space that stores data to be written to or retrieved from the respective storage media, said data transferred between the shared memory space and the respective local read/write channels without being stored in an intermediary memory space located between said local read/write channels and said shared memory space.

5. The apparatus of claim 2, wherein the shared resource module operates to store said data across the data storage media in accordance with a selected RAID methodology.

6. The apparatus of claim 5, wherein the shared resource module is characterized as a first module, and wherein the apparatus further comprises a second shared resource module nominally identical to the first module and physically interconnected to each of the n local data storage.

7. An apparatus comprising:
    a plural number n local data storage units each comprising a local programmable processor, a local servo circuit controlled by the local programmable processor, a local read/write channel and a housing which encloses a moveable data transducer adjacent a data storage medium; and
    a shared resource module which physically interconnects the n local data storage units, the module comprising a single shared memory buffer that stores data to be written to or retrieved from the respective n storage media of the n data storage units, the single shared memory buffer further storing a single complete copy of a shared programming instruction set that is jointly accessed by the respective n local programmable processors during positional control of the associated transducers by the associated servo control circuits using peer-to-peer bus arbitration techniques, the shared programming instruction set characterized as a single shared servo code set resident in a single memory device of the shared resource module so that n copies of the single shared servo code set are not concurrently stored in the n local data storage units.

8. The apparatus of claim 7, wherein the single shared servo code set eliminates a need for n−1 duplicate sets of said servo code set in said n local data storage units.

9. The apparatus of claim 7, wherein the module further comprises a subgroup processor which directs transfer of data between the shared memory buffer of the module and each of the read/write circuits of the n local units.

10. The apparatus of claim 7, wherein the shared resource module operates to store said data across the data storage media in accordance with a selected RAID methodology so that each of the n local data storage units concurrently transfer data from the buffer to the associated n data storage media.

11. The apparatus of claim 7, further comprising a shared host interface block which controls each of the plurality of read/write channels of said data storage units.

12. An apparatus comprising:
    a plural number n local data storage devices each comprising a local programmable processor, a local servo circuit controlled by the local programmable processor, a local read/write channel and a local data storage memory, each of the n local data storage devices lacking sufficient local programming code for the local programmable processor to operate the associated local servo circuit; and a shared resource module which physically interconnects the n local data storage devices and supplies said local programming code thereto sufficient to configure the n local data storage devices as an operable redundant array of inexpensive devices (RAID), the module comprising a top level processor and a single shared memory buffer which stores a complete programming set concurrently accessed and used by each of the n local processors to concurrently transfer data in a RAID configuration between the shared memory buffer and the associated n data storage memories, the programming set characterized as a single shared servo code set jointly accessed by the n local programmable processors of the n local data storage devices to operate the associated local servo circuits during positional control of data transducers adjacent the data storage memories, the single shared servo code set eliminating a need to provide individual copies of the servo code set in the n local data storage devices.

13. The apparatus of claim 12, in which the single shared servo code set is jointly accessed by the local programmable processors in the n local data storage devices using peer-to-peer bus arbitration techniques during positional control by the associated local programmable processors of the read/write transducers adjacent the associated n memories of the n local data storage units using the n local servo circuits.

14. The apparatus of claim 12, in which the n local data storage units are characterized as a first RAID module, and the apparatus further comprises a plural number m local data storage units connected to the shared resource module to form a second RAID module, each of the m local data storage units comprising local processor, a local read/write channel and a local data storage memory and lacking sufficient resources to operate as a stand-alone data storage unit apart from the shared resource module.

15. The apparatus of claim 14, in which the local processors of the m local data storage units concurrently access the shared programming set to mirror data stored to the n memories of the n local data storage devices of the first RAID module.

16. The apparatus of claim 12, in which the n local programmable processors and the shared resource module form a first lower-tier RAID storage unit and the apparatus further comprises a plurality of additional lower-tier RAID storage units nominally identical to the first lower-tier RAID storage unit and which combine with said first storage unit to form a higher-tier RAID array.

17. The apparatus of claim 12, in which the memory in each of the n local data storage devices is characterized as a rotatable magnetic recording disc.

* * * * *